(12) United States Patent
Aoki et al.

(10) Patent No.: US 8,855,235 B2
(45) Date of Patent: Oct. 7, 2014

(54) CIRCUIT TRANSMISSION APPARATUS AND TRANSMISSION METHOD

(75) Inventors: Taku Aoki, Yokohama (JP); Takayoshi Kyono, Yokohama (JP); Kazuya Kitasako, Yokohama (JP)

(73) Assignee: Fujitsu Semiconductor Limited, Yokohama (JP)

( * ) Notice: Subject to any disclaimer, the term of this patent is extended or adjusted under 35 U.S.C. 154(b) by 255 days.

(21) Appl. No.: 12/792,517

(22) Filed: Jun. 2, 2010

(65) Prior Publication Data

US 2010/0310008 A1    Dec. 9, 2010

(30) Foreign Application Priority Data

Jun. 3, 2009    (JP) .................................. 2009-134353

(51) Int. Cl.
| | | |
|---|---|---|
| *H04L 27/36* | (2006.01) | |
| *H04L 27/26* | (2006.01) | |
| *H04L 5/00* | (2006.01) | |
| *H04L 27/34* | (2006.01) | |

(52) U.S. Cl.
CPC .......... *H04L 27/2614* (2013.01); *H04L 5/0007* (2013.01); *H04L 27/3405* (2013.01); *H04L 5/0037* (2013.01); *H04L 27/2613* (2013.01)
USPC .......................................... 375/298; 375/295

(58) Field of Classification Search
CPC ......... H04L 1/005; H04L 1/006; H04L 5/026; H04L 27/34; H04L 27/362; H04L 1/0618; H03M 13/29; H03M 13/256–13/258; H03M 13/2957
USPC ................. 375/130, 295, 297, 298, 260, 267; 370/206; 714/755
See application file for complete search history.

(56) References Cited

U.S. PATENT DOCUMENTS

| | | | | | |
|---|---|---|---|---|---|
| 5,963,592 | A | * | 10/1999 | Kim ............................... | 375/232 |
| 7,463,697 | B2 | * | 12/2008 | Maltsev et al. ................ | 375/297 |
| 7,746,761 | B2 | * | 6/2010 | Green ............................ | 370/206 |
| 7,809,078 | B2 | * | 10/2010 | Hori et al. ...................... | 375/295 |
| 2003/0226087 | A1 | * | 12/2003 | Cameron et al. ............... | 714/755 |
| 2005/0105593 | A1 | * | 5/2005 | Dateki et al. .................. | 375/130 |
| 2005/0111568 | A1 | * | 5/2005 | Adachi ......................... | 375/295 |
| 2005/0259565 | A1 | | 11/2005 | Fujii et al. | |
| 2008/0214120 | A1 | | 9/2008 | Nakaya et al. | |

FOREIGN PATENT DOCUMENTS

| | | | |
|---|---|---|---|
| JP | 2000-332723 | A | 11/2000 |
| JP | 2001-333043 | A | 11/2001 |
| JP | 2005-322998 | A | 11/2005 |
| JP | 2008-099092 | A | 4/2008 |
| JP | 2008-187602 | A | 8/2008 |
| JP | 2008-252256 | A | 10/2008 |
| JP | 2009/239549 | A | 10/2009 |
| WO | WO 2006/035704 | A1 | 4/2006 |

OTHER PUBLICATIONS

Japanese Office Action dated Jul. 9, 2013, 6 pages.
Japanese Office Action, Notification for Reason for Refusal, dated Apr. 2, 2013, 6 pages.

* cited by examiner

*Primary Examiner* — Daniel Washburn
*Assistant Examiner* — Fitwi Hailegiorgis
(74) *Attorney, Agent, or Firm* — Arent Fox LLP (57) ABSTRACT

A transmission apparatus includes: a multiplier configured to multiply a signal provided on a complex plane by a multiplication coefficient corresponding to a number of transmission sub-carriers; and an inverse fast Fourier transformer configured to perform an inverse fast Fourier transform on the multiplied signal.

19 Claims, 12 Drawing Sheets

CIRCUIT TRANSMISSION APPARATUS AND TRANSMISSION METHOD

CROSS-REFERENCE TO RELATED APPLICATIONS

This application claims the benefit of priority from Japanese Patent Application No. 2009-134353 filed on Jun. 3, 2009, the entire contents of which are incorporated herein by reference.

BACKGROUND

1. Field

Embodiments discussed herein relate to a transmission apparatus.

2. Description of Related Art

Wireless communication methods include orthogonal frequency-division multiplexing (OFDM) and orthogonal frequency-division multiple access (OFDMA).

Related technology is disclosed in Japanese Laid-open Patent Publication No. 2000-332723, International Publication No. WO2006/035704 pamphlet.

SUMMARY

According to one aspect of the embodiments, a transmission apparatus is provided which includes a multiplier configured to multiply a signal provided on a complex plane by a multiplication coefficient corresponding to a number of transmission sub-carriers; and an inverse fast Fourier transformer configured to perform an inverse fast Fourier transform on the multiplied signal.

Additional advantages and novel features of the invention will be set forth in part in the description that follows, and in part will become more apparent to those skilled in the art upon examination of the following or upon learning by practice of the invention.

DESCRIPTION OF EMBODIMENTS

Figure 1:
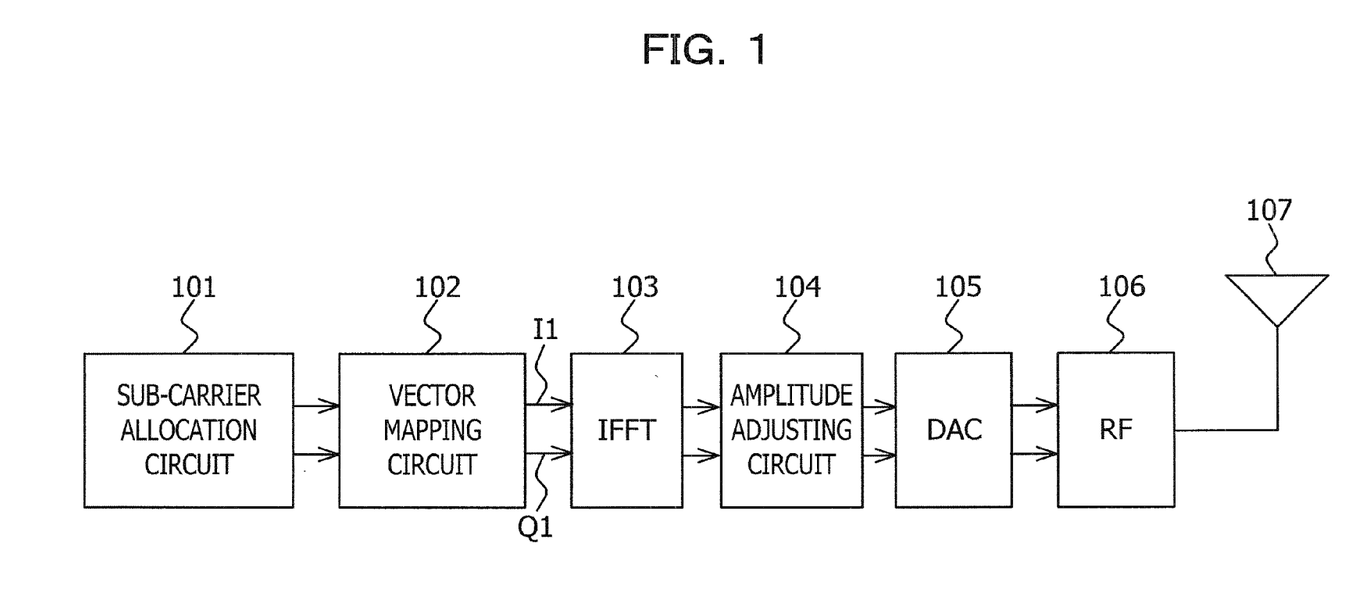
FIG. 1 illustrates an exemplary wireless communication apparatus.

FIG. 1 illustrates an exemplary wireless communication apparatus. The wireless communication apparatus illustrated in FIG. 1 may be an OFDMA terminal apparatus. The OFDMA method employs Worldwide Interoperability for Microwave Access (WiMAX). The terminal apparatus may use WiMAX for communication. The terminal apparatus includes a sub-carrier allocation circuit 101, a vector mapping circuit 102, an inverse fast Fourier transformer 103, an amplitude adjustment circuit 104, a digital-to-analog converter 105, a radio frequency (RF) circuit 106, and an antenna 107.

Figure 2:
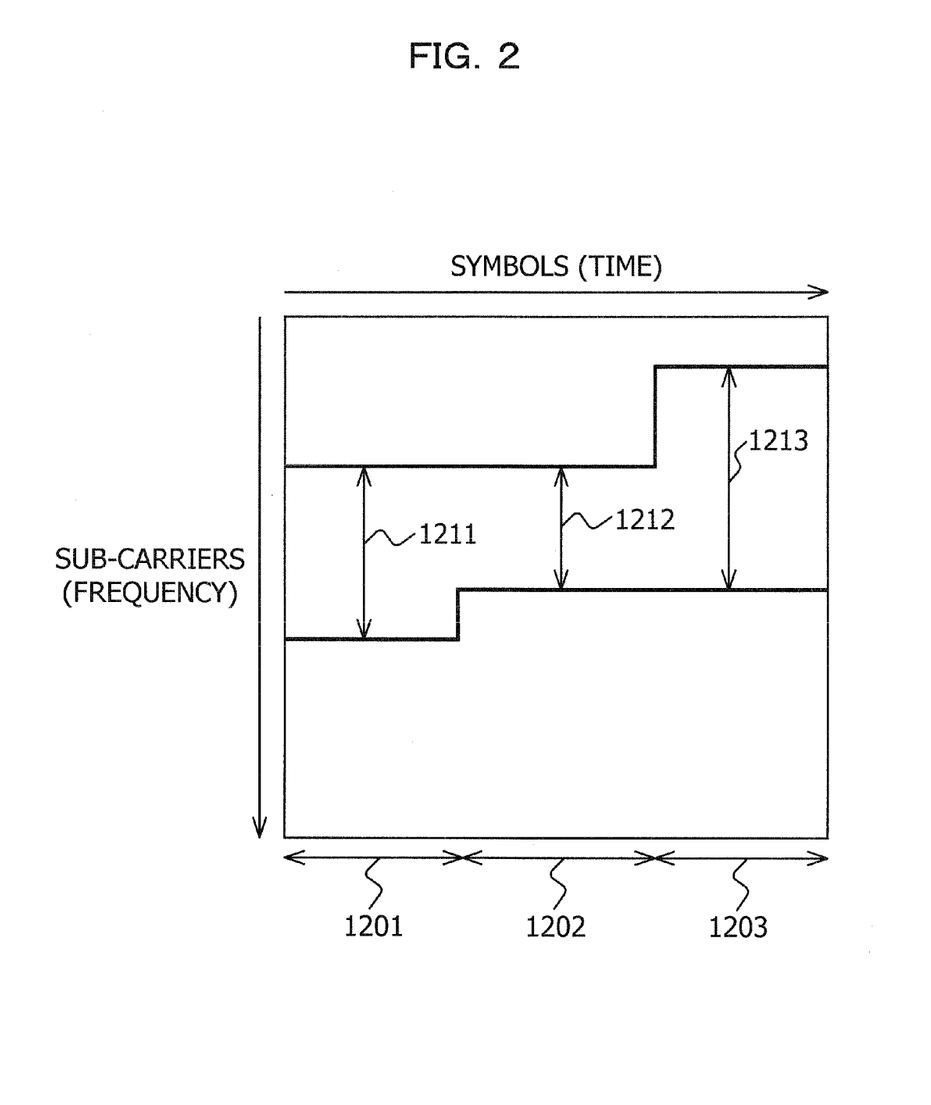
FIG. 2 illustrates an exemplary transmission sub-frame.

FIG. 2 illustrates an exemplary transmission sub-frame. The OFDMA terminal apparatus may transmit the transmission sub-frame illustrated in FIG. 2. The transmission sub-frame is represented by a two-dimensional logic map of transmission sub-carriers, which are frequency units, and symbols, which are time units. For example, the terminal apparatus illustrated in FIG. 1 carries out wireless communication with a base station. The base station may carry out wireless communication with a plurality of terminal apparatuses. The base station allocates transmission sub-carriers to be used for each symbol to each terminal apparatus. The total number of transmission sub-carriers may be a finite value. The base station allocates a small number of transmission sub-carriers to each terminal apparatus when the number of terminal apparatus subjected to communication is large and allocates a large number of transmission sub-carriers to each terminal apparatus when the number of terminal apparatus subjected to communication is small. The base station allocates a large number of transmission sub-carriers to a terminal apparatus that requests transmission of a large amount of transmission data and allocates a smaller number of transmission sub-carriers to terminal apparatus that request transmission of a small amount of transmission data. For example, a first terminal apparatus is allocated a number of transmission sub-carriers 1211 for a period 1201, a number of transmission sub-carriers 1212 for a period 1202, and a number of transmission sub-carriers 1213 for a period 1203. The number of transmission sub-carriers allocated to a terminal apparatus may vary for each symbol.

The sub-carrier allocation circuit 101 illustrated in FIG. 1 allocates transmission sub-carriers for each symbol, which is a time unit. For example, in response to instructions from the base station, the sub-carrier allocation circuit 101 allocates the number of transmission sub-carriers 1211 for the period 1201, the number of transmission sub-carriers 1212 for the period 1202, and the number of transmission sub-carriers 1213 for the period 1203.

Figure 3:
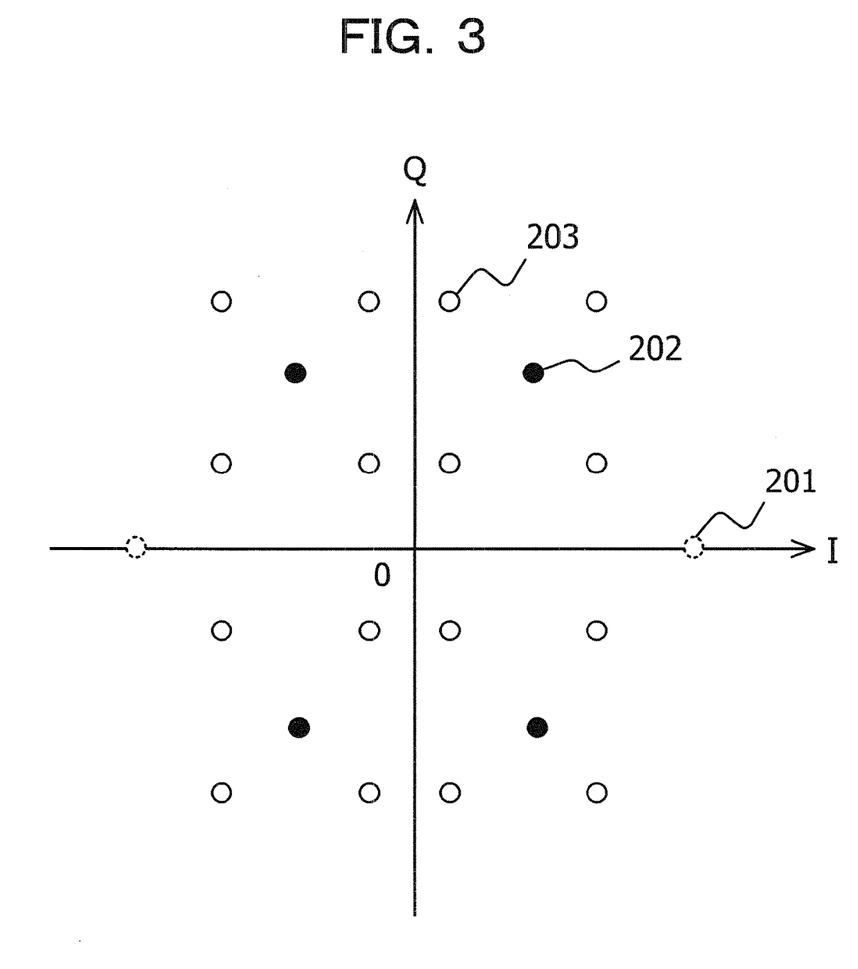
FIG. 3 illustrates an exemplary example mapping process.

FIG. 3 illustrates an exemplary mapping process. The vector mapping circuit 102 illustrated in FIG. 1 may carry out the mapping process illustrated in FIG. 3. FIG. 3 illustrates constellation points arranged on a complex plane. The horizontal axis represents I channel signals, whereas the vertical axis represents Q channel signals. The modulation methods include binary phase shift keying (BPSK), quadrature phase shift keying (QPSK), and quadrature amplitude modulation (16QAM). BPSK is represented by two codes at two constellation points 201 of the I channel signals and the Q channel signals. QPSK is represented by four codes at four constellation points 202 of the I channel signals and the Q channel signals. 16 QAM is represented by 16 codes at 16 constellation points 203 of the I channel signals and the Q channel signals.

The vector mapping circuit 102 illustrated in FIG. 1 maps the codes of the transmission sub-carriers allocated by the sub-carrier allocation circuit 101 at the constellation points arranged on, for example, the complex plane illustrated in FIG. 3 according to the modulation method. After the mapping, an I channel signal I1 and a Q channel signal Q1 are output.

The inverse fast Fourier transformer 103 carries out inverse fast Fourier transformation on the constellation points of the I channel signal I1 and the Q channel Q1 output from the vector mapping circuit 102 and converts these signals in a frequency domain to signals in a time domain.

Figure 4:
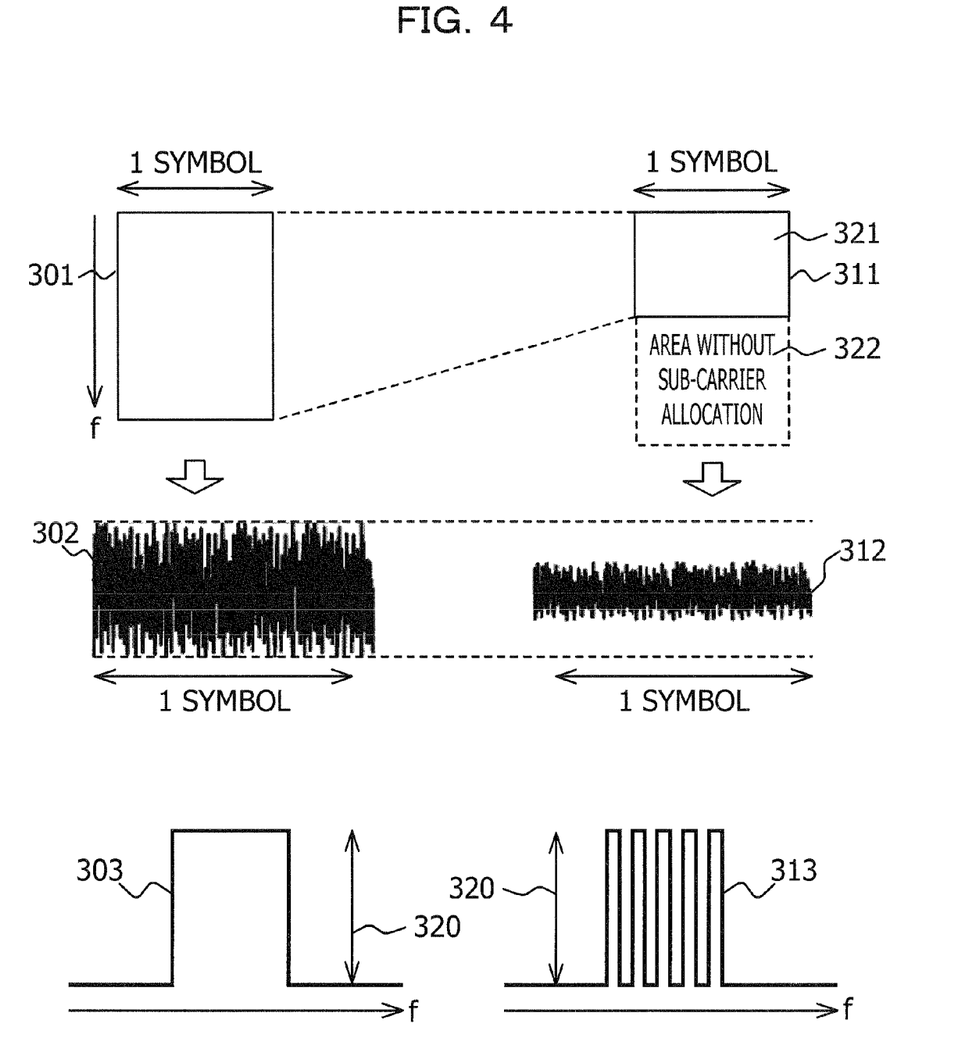
FIG. 4 illustrates an exemplary relationship between a number of transmission sub-carriers and a signal.

FIG. 4 illustrates an exemplary relationship between the number of transmission sub-carriers and a signal. Transmission sub-carriers 301 and 311 represent transmission sub-carriers allocated for one symbol. The all transmission sub-carriers 301 represent a case in which all of the transmission sub-carriers are allocated and the transmission is performed using all of transmission sub-carriers. The part transmission sub-carriers 311 represent a case in which one part of the transmission sub-carriers 321 are allocated, the other part of transmission sub-carriers 322 not being allocated and the transmission is performed using the part of the transmission sub-carriers 321.

A time-domain signal 302 may be an output signal per symbol of the inverse fast Fourier transformer 103 when the all transmission sub-carriers 301 are used. A time-domain signal 312 may be an output signal per symbol of the inverse fast Fourier transformer 103 when the part transmission sub-carriers 311 are used. A frequency spectrum 303 may indicate a frequency spectrum of the time-domain signal 302. A frequency spectrum 313 may indicate a frequency spectrum of the time-domain signal 312.

In the time-domain signal 312 where the part transmission sub-carriers 311 are allocated, the amplitude may be smaller than that of the time-domain signal 302 where the all transmission sub-carriers 301 are allocated, and thus transmission power may decrease.

The frequency spectrum 313 where the part transmission sub-carriers 311 are allocated may be a comb-like spectrum with respect to a frequency interleave. In the logic map illustrated in FIG. 3, the allocated transmission sub-carriers may be continuous. A comb-like transmission sub-carrier signal, such as that represented by the frequency spectrum 313 in FIG. 4, may be transmitted by randomizing. When one first terminal apparatus transmits a signal having the frequency spectrum 313, the other terminal apparatus may use a comb-like sub-carrier. The height 320 of the frequency spectrum 313 in a signal the part transmission sub-carriers 311 are allocated may be substantially the same as the height 320 of the frequency spectrum 303 of the signal where the all transmission sub-carriers 301 are allocated.

When the number of the transmission sub-carriers changes, the amplitudes of the time-domain signals 302 and 312 may also change.

The amplitude adjustment circuit 104 adjusts the amplitude of the time-domain signals converted by the inverse fast Fourier transformer 103 such that it is substantially constant, regardless of the number of the transmission sub-carriers. The amplitude adjustment circuit 104 multiplies the time-domain signals converted by the inverse fast Fourier transformer 103 by a multiplication coefficient.

Figure 5:
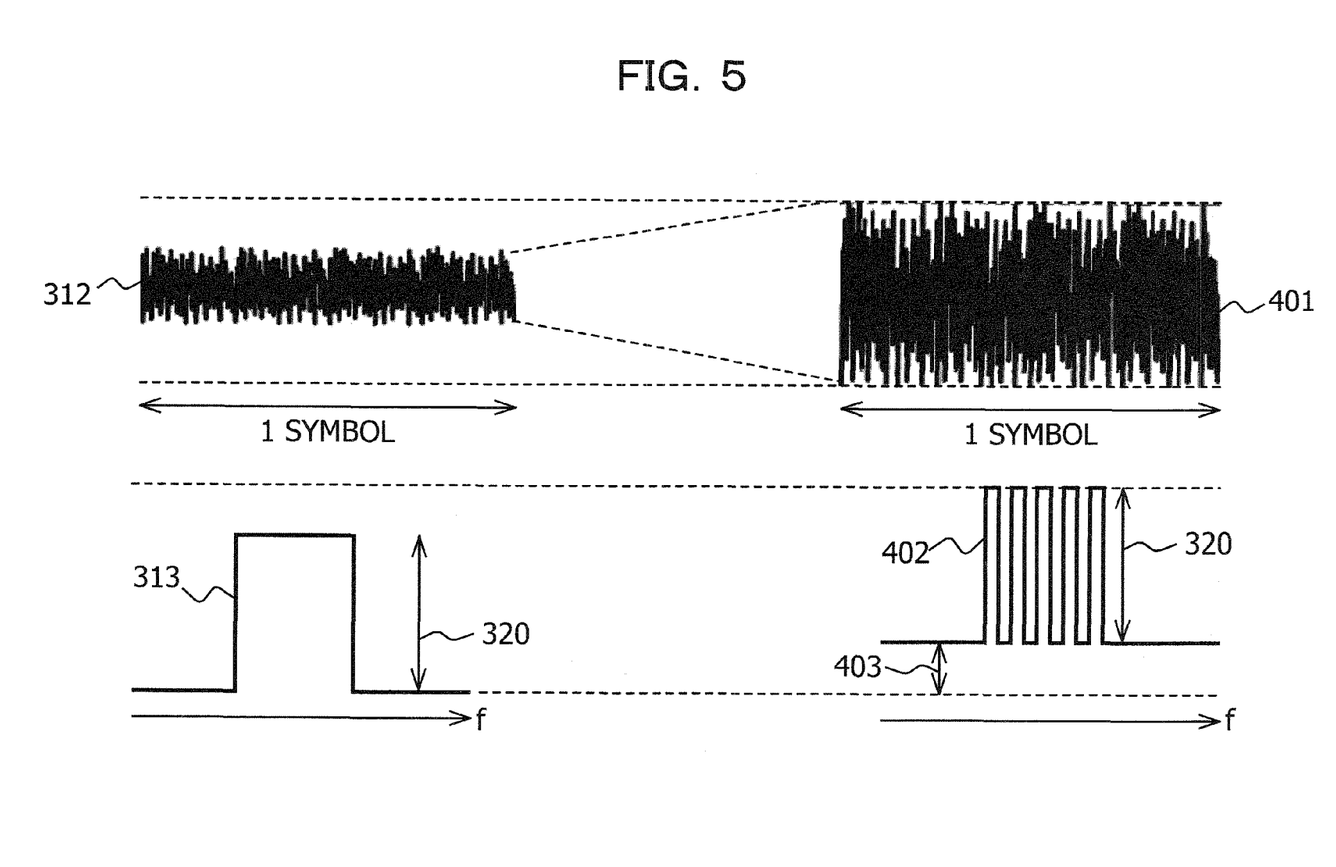
FIG. 5 illustrates an exemplary input signal and an exemplary output signal.

FIG. 5 illustrates an exemplary input signal and an exemplary output signal. The exemplary input signal and the exemplary output signal illustrated in FIG. 5 may the input signal and the output signal of the amplitude adjustment circuit 104 illustrated in FIG. 1. The amplitude adjustment circuit 104 multiplies the time-domain signal 312 by the multiplication coefficient and outputs a time-domain signal 401. The time-domain signal 312 may be substantially the same as the time-domain signal 312 illustrated in FIG. 4 and may be a time-domain signal per symbol when the part transmission sub-carriers 311 are allocated. In some cases, the amplitude may be small. The time-domain signal 401 may be an output signal of the amplitude adjustment circuit 104 and may have an amplitude or transmission power larger than the time-domain signal 312. The amplitude adjustment circuit 104 multiplies the multiplication coefficient depending on the number of transmission sub-carriers and may output a signal having substantially constant amplitude, regardless of the number of transmission sub-carriers.

The frequency spectrum 313 may be substantially the same as the frequency spectrum 313 illustrated in FIG. 3 and may be a frequency spectrum of the time-domain signal 312. A frequency spectrum 402 may be a frequency spectrum of the time-domain signal 401. The height 320 of the frequency spectrum 402 may be substantially the same as the height 320 of the frequency spectrum 313. Since the amplitude adjustment circuit 104 multiplies all frequency components, the noise floor 403 may rise. The noise floor 403 may be the noise of all frequency components.

When the time-domain signal 302 illustrated in FIG. 4 where the all transmission sub-carriers 301 are allocated is input, the amplitude adjustment circuit 104 outputs the time-domain signal 302 having an amplitude substantially the same as that of the time-domain signal 302. The amplitude of the post-multiplication time-domain signal 401 where the part transmission sub-carriers 311 are allocated may be substantially the same as the amplitude of the post-multiplication time-domain signal 302 where the all transmission sub-carriers 301 are allocated. The height 320 of the frequency spectrum 402 of the post-multiplication time-domain signal 401 where the part transmission sub-carriers 311 are allocated may be substantially the same as the height 320 of the frequency spectrum 303 of the post-multiplication time-domain signal 302 where the all transmission sub-carriers 301 are allocated. In such a configuration, the noise floor 403 may rise.

The digital-to-analog converter 105 illustrated in FIG. 1 converts a signal adjusted by the amplitude adjustment circuit 104 from digital to analog. The RF circuit 106 converts the signal converted by the digital-to-analog converter 105 from a low-frequency base-band signal to a high-frequency RF signal, and wirelessly transmits this RF signal to the base station via the antenna 107.

If the multiplication coefficient multiplied by the time-domain signal 312 is substantially constant in a transmission sub-frame or a symbol period, the amplitudes of the entire frequency band may change. Thus, the noise floor 403 may rise.

Figure 6:
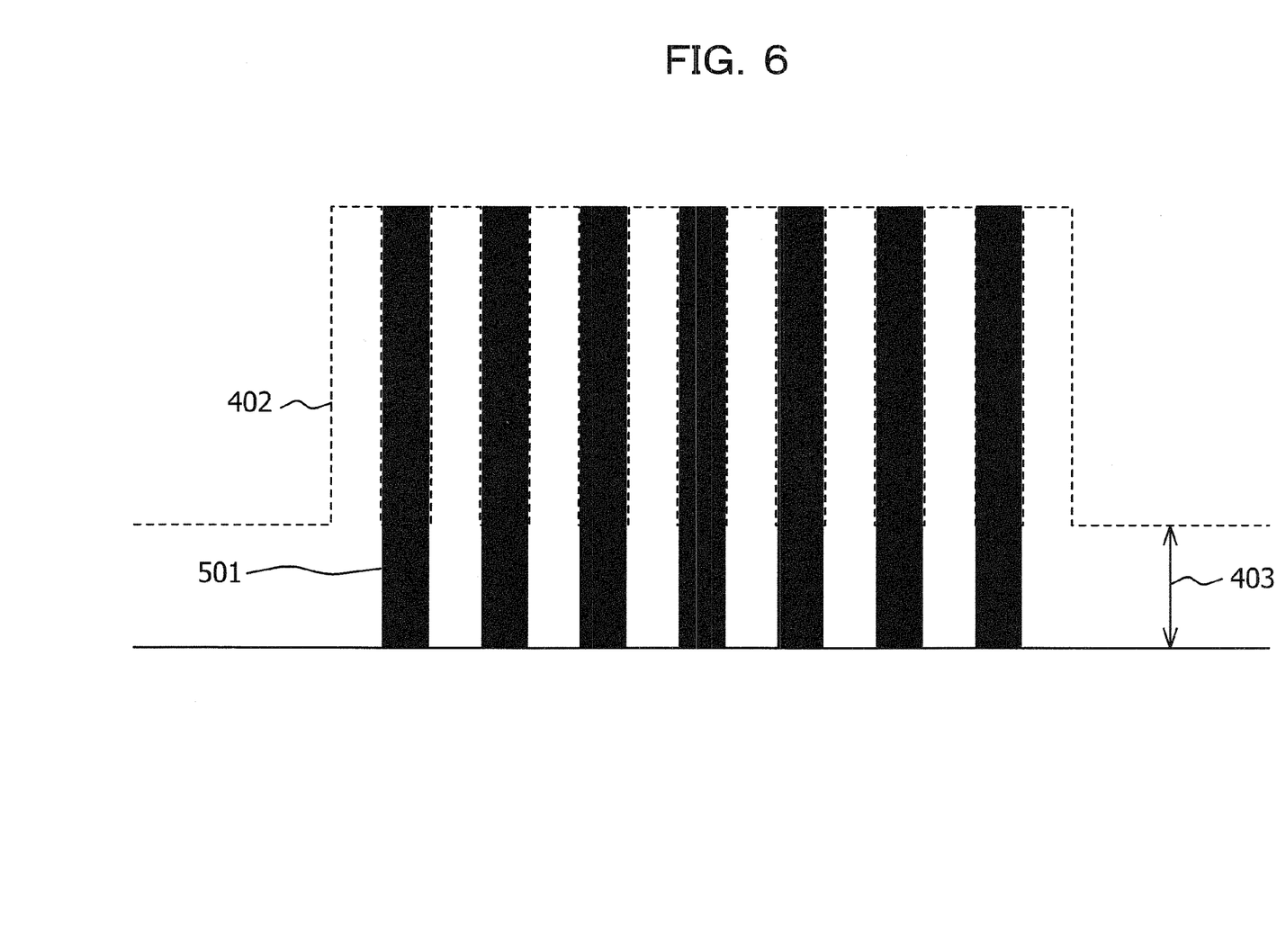
FIG. 6 illustrates an exemplary transmission signal.

FIG. 6 illustrates an exemplary transmission signal. The exemplary transmission signal illustrated in FIG. 6 may be a transmission signal from one terminal apparatus or the other terminal apparatus. The one terminal apparatus may transmit, for example, a signal 402 having the noise floor 403 illustrated in FIG. 5. The other terminal apparatus may transmit, for example, a signal 501 having a noise floor of zero. The base station receives and combines the signal 402 from the one terminal apparatus and the signal 501 from the other terminal apparatus. At the base station receiving the signals 402 and 502, the noise floor 403 of the signal 402 from the one terminal apparatus may interfere with the signal 501 from the other terminal apparatus. The S/N ratio of the signal from the one terminal apparatus may worsen due to the rising noise floor 403. The S/N ratio of the signal 501 from the other terminal apparatus may worsen due to interference of the signal 402 from the first terminal apparatus with the noise floor 403.

Figure 7:
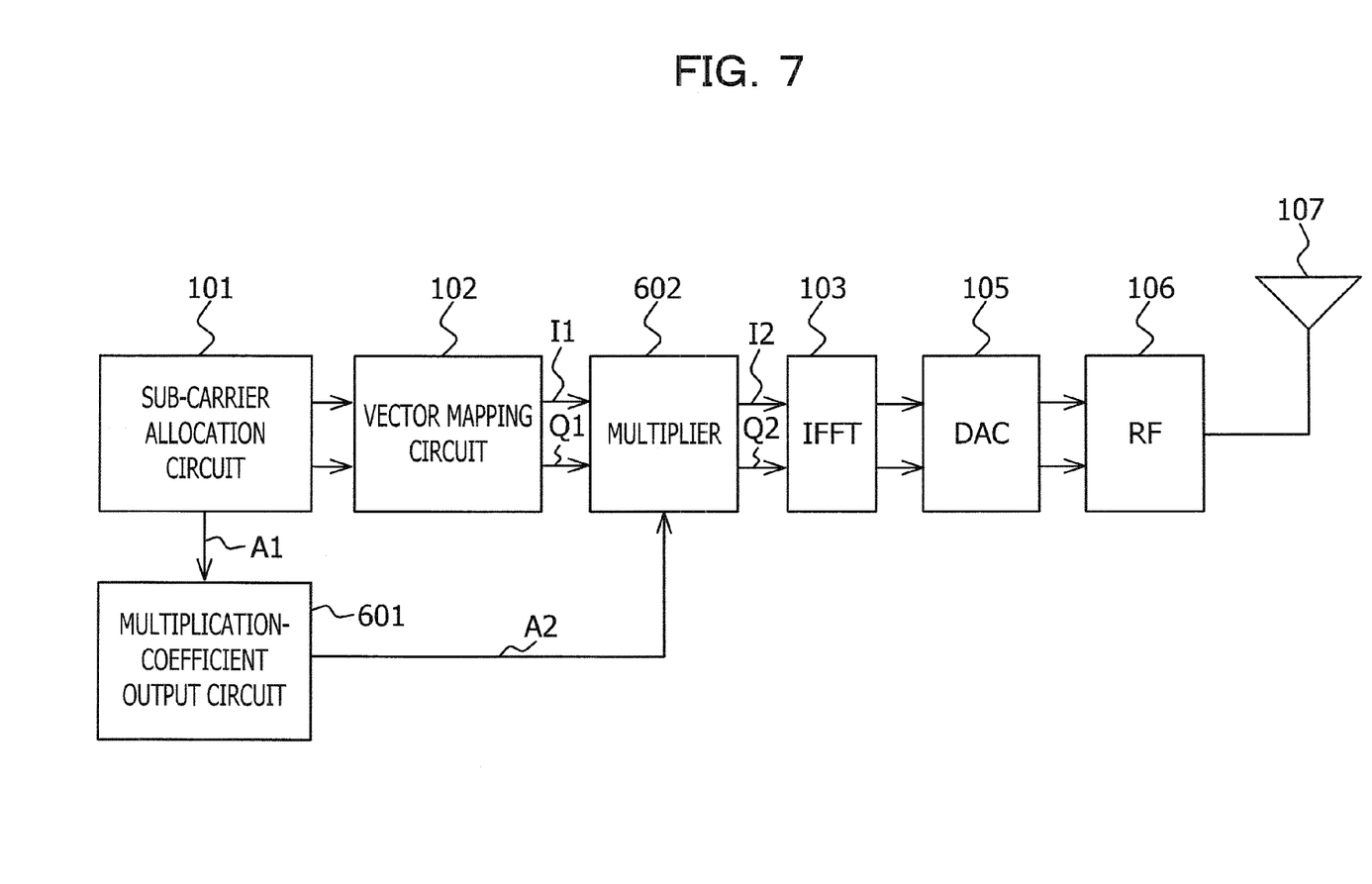
FIG. 7 illustrates an exemplary wireless transmission apparatus.

FIG. 7 illustrates an exemplary wireless transmission apparatus. The wireless transmission apparatus illustrated in FIG. 7 may be an OFDMA terminal apparatus. The OFDMA method may employ WiMAX. The terminal apparatus may use WiMAX for communication. The terminal apparatus illustrated in FIG. 7 includes a multiplication-coefficient output circuit 601 and a multiplier 602. The terminal apparatus illustrated in FIG. 7 may or may not include the amplitude adjustment circuit 104 illustrated in FIG. 1. This terminal apparatus may include the sub-carrier allocation circuit 101, the vector mapping circuit 102, the inverse fast Fourier transformer 103, the digital-to-analog converter 105, the RF circuit 106, the antenna 107, the multiplication-coefficient output circuit 601, and the multiplier 602.

The sub-carrier allocation circuit 101 illustrated in FIG. 7 allocates transmission sub-carriers for each symbol, which is a time unit. For example, in response to instructions from the base station, the sub-carrier allocation circuit 101 allocates the transmission sub-carriers 1211 in the period 1201, allocates the transmission sub-carriers 1212 in the period 1202, and allocates the transmission sub-carriers 1213 in the period 1203.

The vector mapping circuit 102 illustrated in FIG. 7 maps the codes of the transmission sub-carriers allocated by the sub-carrier allocation circuit 101 to the constellation points arranged on, for example, the complex plane illustrated in FIG. 3 according to the modulation method. After mapping, an I channel signal I1 and a Q channel Q1 are output.

The multiplication-coefficient output circuit 601 counts the number of transmission sub-carriers for each symbol based on transmission sub-carriers A1 allocated by the sub-carrier allocation circuit 101 and outputs a multiplication coefficient A2 corresponding to the counted the number of the transmission sub-carriers.

The multiplier 602 multiplies the constellation points of the signals I1 and Q1 arranged on the complex plane, such as that illustrated in FIG. 3, mapped by the vector mapping circuit 102 by the multiplication coefficient A2 output from the multiplication-coefficient output circuit 601, and outputs an I channel signal I2 and a Q channel signal Q2.

Figure 8:
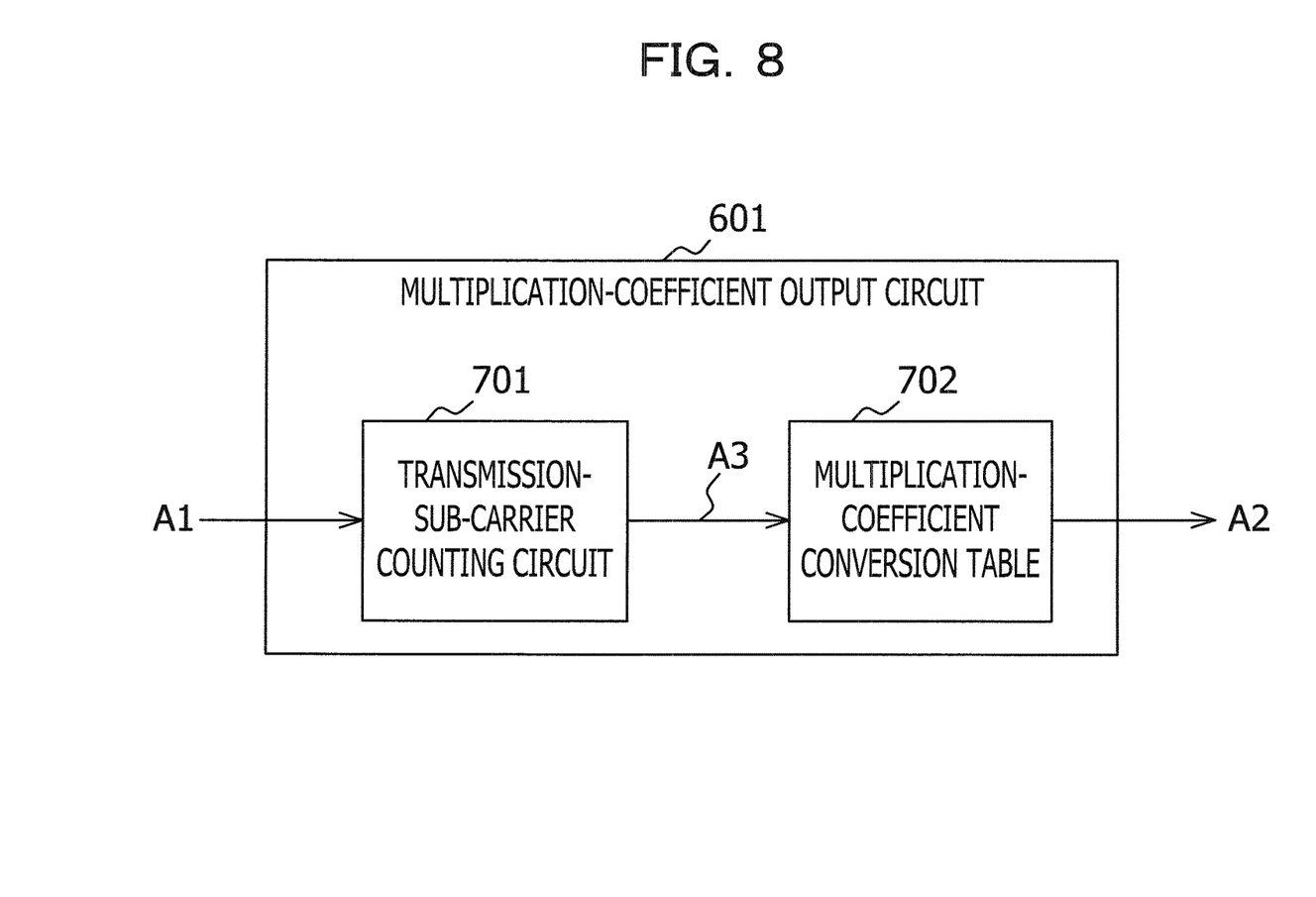
FIG. 8 illustrates an exemplary multiplication-coefficient output circuit.

FIG. 8 illustrates an exemplary multiplication-coefficient output circuit. The multiplication-coefficient output circuit 601 includes a transmission-sub-carrier counting circuit 701 and a multiplication-coefficient conversion table 702. The transmission-sub-carrier counting circuit 701 monitors an enable signal A1 of each transmission sub-carrier for each symbol from the sub-carrier allocation circuit 101, counts the number of transmission sub-carriers, and outputs a number of transmission sub-carriers A3. For example, the enable signal A1 of a signal of the allocated transmission sub-carriers may be set to "1", where as the enable signal A1 of a signal of transmission sub-carriers that is not allocated may be set to "0". The multiplication-coefficient conversion table 702 converts the number of transmission sub-carriers A3 to the multiplication coefficient A2 and outputs the multiplication coefficient A2.

Figure 11:
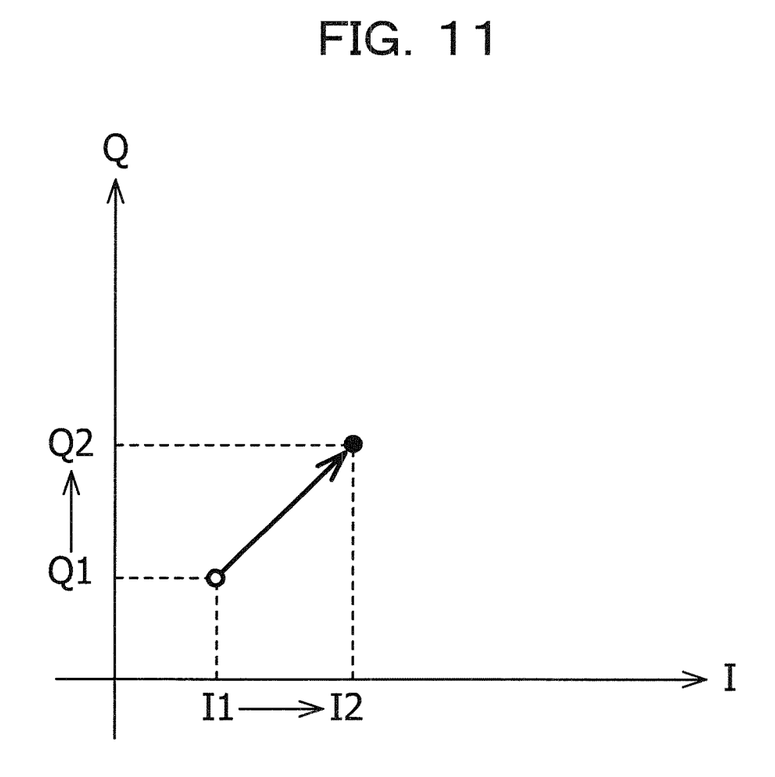
FIG. 11 illustrates an exemplary pre-multiplication signal and an exemplary post-multiplication signal.

FIG. 11 illustrates an exemplary pre-multiplication signal and an exemplary post-multiplication signal. The multiplier 602 illustrated in FIG. 7 multiplies the I channel signal I1 and the Q channel signal Q1 by the multiplication coefficient A2 and outputs the I channel signal I2 and the Q channel signal Q2. The transmission power of the constellation points of the I channel signal I2 and the Q channel signal Q2 may be greater than the transmission power of the constellation points of the I channel signal I1 and the Q channel signal Q1.

Figure 12:
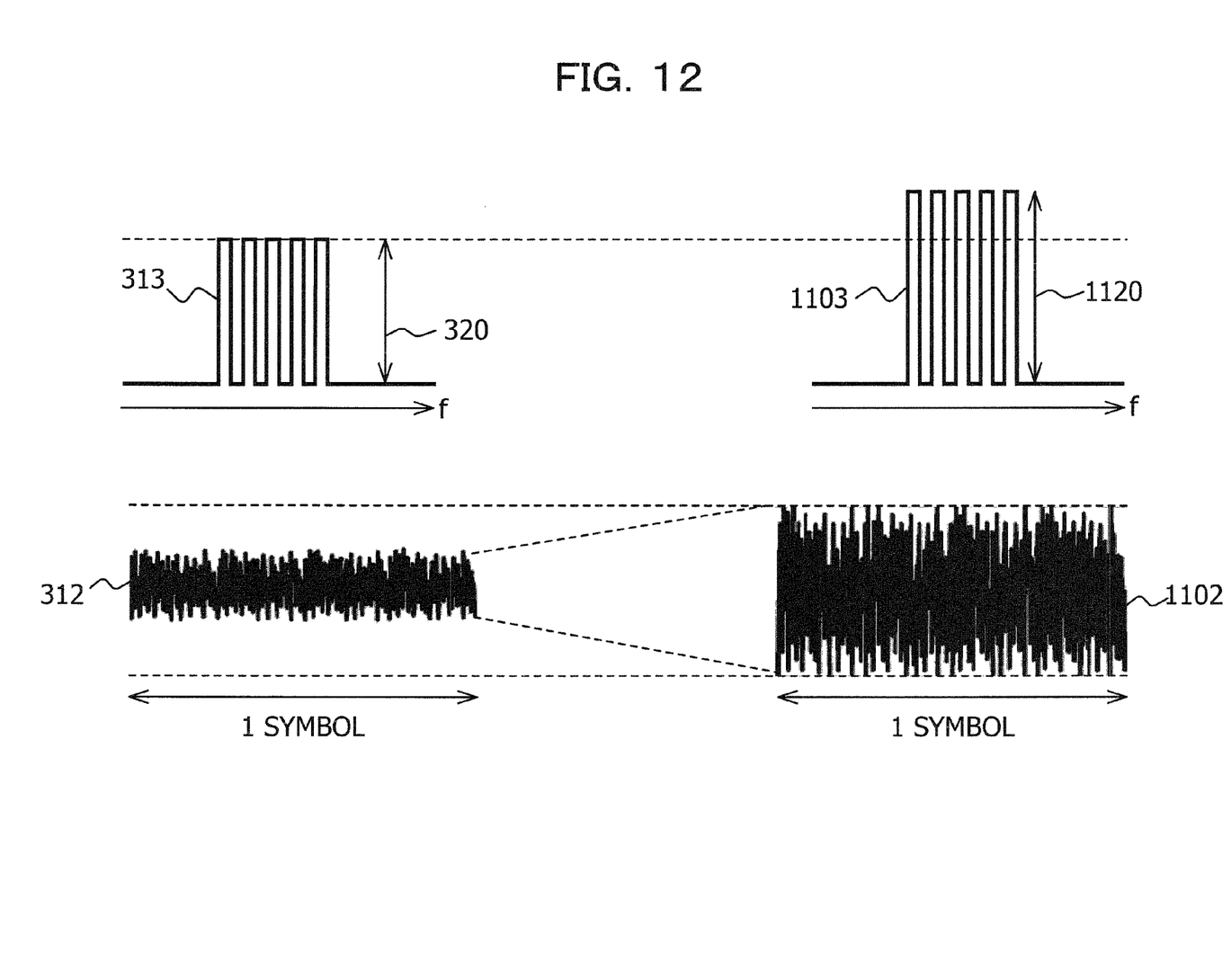
FIG. 12 illustrates an exemplary input signal and an exemplary output signal.

FIG. 12 illustrates an exemplary input signal and an exemplary output signal. The input signal and the output signal illustrated in FIG. 12 may be an input signal and an output signal of the multiplier 602 illustrated in FIG. 7 or 9. The multiplier 602 multiplies a signal having a frequency spectrum 313 by the multiplication coefficient A2 and outputs a signal having a frequency spectrum 1103. The frequency spectrum 313 may be substantially the same as the frequency spectrum 313 illustrated in FIG. 4. The frequency spectrum 313 may be a frequency spectrum of a signal where the transmission sub-carriers 311 are allocated and may have a height 320. The frequency spectrum 1103 may be an output of the multiplier 602. The height 1120 of the frequency spectrum 1103 may be greater than the height 320 of the frequency spectrum 313. The noise floor of the frequency spectrum 1103 may be substantially the same as the noise floor of the frequency spectrum 313 and may not rise. The time-domain signal 312 may correspond to a time-domain signal having the frequency spectrum 313, whereas the time-domain signal 1102 may correspond to a time-domain signal having the frequency spectrum 1103. Due to the multiplication of the multiplier 602, the amplitude or the transmission power of the post-multiplication time-domain signal 1102 may be greater than that of the pre-multiplication time-domain signal 312.

When a signal having the frequency spectrum 303, where the transmission sub-carriers 301 illustrated in FIG. 4 are allocated is input, the multiplier 602 may output a signal of the frequency spectrum 303 having substantially the same height as the input frequency spectrum. The amplitude of the post-multiplication time-domain signal 1102 where the part transmission sub-carriers 311 are allocated may be substantially the same as the amplitude of the post-multiplication time-domain signal 302 where the part transmission sub-carriers 301 are allocated. Thus, the multiplier 602 may multiply the multiplication coefficient corresponding to the number of transmission sub-carriers and output a signal having a substantially constant amplitude.

The inverse fast Fourier transformer 103 illustrated in FIG. 7 carries out inverse fast Fourier transformation on the I channel signal I1 and the Q channel Q1 multiplied by the multiplier 602 and converts signals in a frequency domain to signals in a time domain.

The digital-to-analog converter 105 converts the signal converted by the inverse fast Fourier transformer 103 from digital to analog. The RF circuit 106 converts the signal converted by the digital-to-analog converter 105, which includes a low-frequency base-band signal, to a high-frequency RF signal and wirelessly transmits the high-frequency RF signal to the base station via the antenna 107.

The multiplication-coefficient output circuit 601 may count the number of transmission sub-carriers for each symbol and output the multiplication coefficient A2 for each symbol. The multiplier 602 has a buffer for one symbol and may multiply the multiplication coefficient A2 for each symbol.

The multiplication-coefficient output circuit 601 may output the multiplication coefficient A2 corresponding to the number of transmission sub-carriers for a symbol including a maximum number of transmission sub-carriers among the plurality of symbols within the transmission sub-frame, as illustrated in FIG. 13. For example, the multiplication-coefficient output circuit 601 counts the number of transmission sub-carriers for each symbol within the transmission sub-frame, as illustrated in FIG. 13. The multiplication coefficient A2, which corresponds to the transmission sub-carrier number 1213 for a symbol for a maximum number of transmission sub-carriers, is output during the transmission sub-frame period. The multiplier 602 may include a buffer for a transmission sub-frame. The timing control of the multiplier 602 may be facilitated.

The multiplication-coefficient output circuit 601 may output the multiplication coefficient A2, which corresponds to the number of transmission sub-carriers of the symbol for the minimum number of transmission sub-carriers among the plurality of symbols within the transmission sub-frame illustrated in FIG. 13. For example, the multiplication-coefficient output circuit 601 counts the number of the transmission sub-carriers of each symbol within the transmission sub-frame illustrated in FIG. 13. The multiplication coefficient A2, which corresponds to the number of the transmission sub-carriers 1212 of the symbol for a minimum number of transmission sub-carriers, is output during the transmission sub-frame period. The multiplier 602 may include a buffer for a transmission sub-frame.

The multiplication-coefficient output circuit 601 may output the multiplication coefficient A2 corresponding to an average value of the number of transmission sub-carrier per symbol within the transmission sub-frame, as illustrated in FIG. 13. For example, the multiplication-coefficient output circuit 601 counts a number of the transmission sub-carriers for each symbol within the transmission sub-frame, as illustrated in FIG. 13. The average value of the number of transmission sub-carriers per symbol within a transmission sub-frame is computed, and the multiplication coefficient A2 corresponding to the average value is output during a transmission sub-frame period. The multiplier 602 may include a buffer for a transmission sub-frame. The timing control of the multiplier 602 may be facilitated.

In the terminal apparatus, the multiplier 602 is disposed upstream of the inverse fast Fourier transformer 103. The noise floor may not rise due to a change in the number of transmission sub-carriers. The amplitude of the transmission signal, for example, transmission power may be maintained substantially constant, and thus communication jamming of the second terminal apparatuses may be reduced.

The terminal apparatus may maintain the amplitude of the transmission signal substantially constant. When the number of transmission sub-carriers is changed, the amplitude may deviate from the dynamic range of the input amplitude of the RF circuit 106.

Since the dynamic range of the input amplitude of the RF circuit 106 may not be large, the input amplitude specification of the RF circuit 106 may be alleviated.

Figure 9:
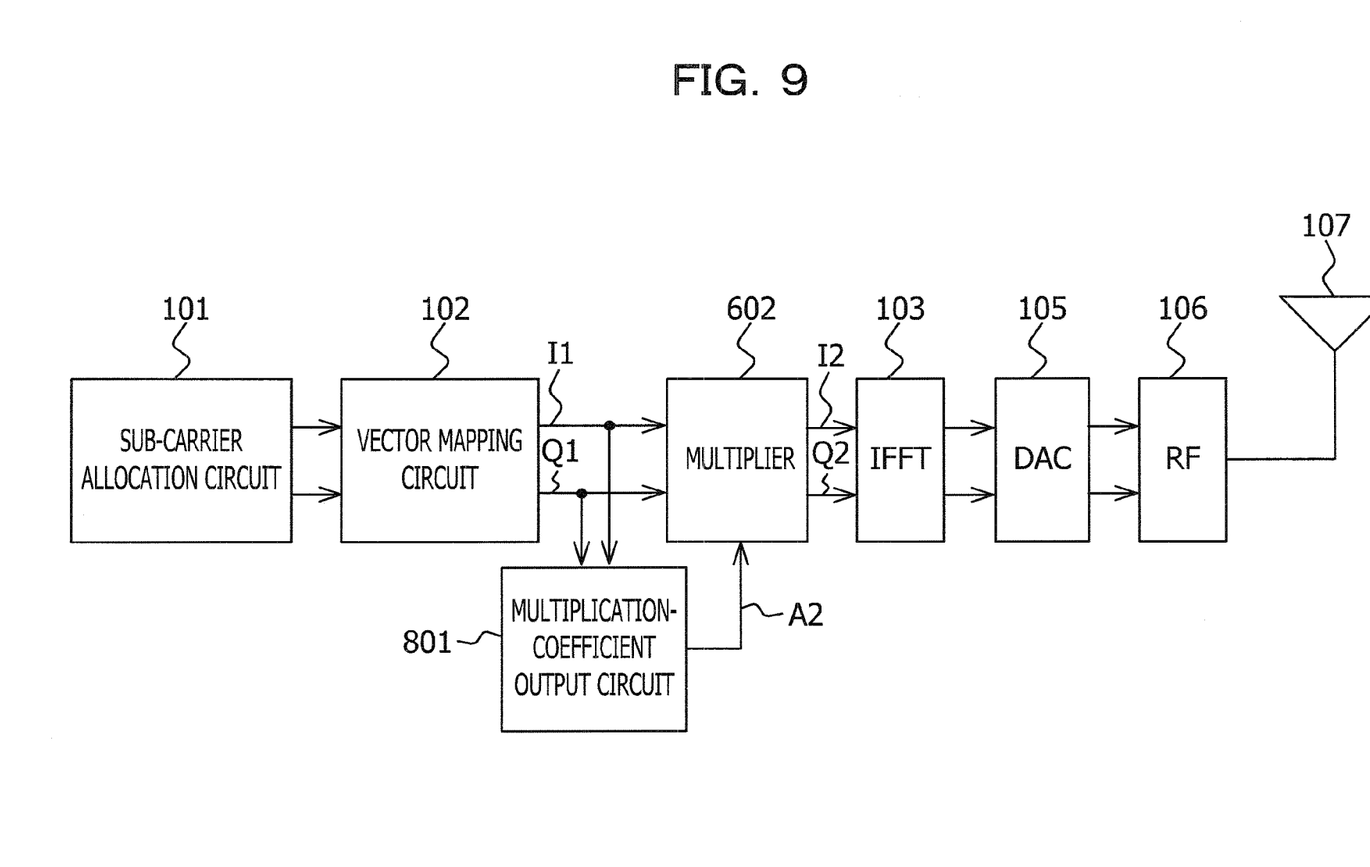
FIG. 9 illustrates an exemplary wireless transmission apparatus.

FIG. 9 illustrates an exemplary wireless transmission apparatus. The terminal apparatus illustrated in FIG. 9 may be an OFDMA terminal apparatus. The terminal apparatus illustrated in FIG. 9 includes a multiplication-coefficient output circuit 801. The terminal apparatus illustrated in FIG. 9 may not include the multiplication-coefficient output circuit 601 illustrated in FIG. 7. The other elements in FIG. 9 may be substantially the same or similar to the elements illustrated in FIG. 7.

The multiplication-coefficient output circuit 801 counts the number of transmission sub-carriers for each symbol based on the constellation points of the signals I1 and Q1 represented on the complex plane illustrated in FIG. 2, which are, for example, mapped by the vector mapping circuit 102. The multiplication coefficient A2 corresponding to the counted number of transmission sub-carriers is output. The multiplier 602 multiplies the constellation points of the signals I1 and Q1 on the complex plane illustrated in FIG. 2, which are mapped by the vector mapping circuit 102, with the multiplication coefficient A2 output from the multiplication-coefficient output circuit 801, and outputs an I channel signal I2 and a Q channel signal Q2.

Figure 10:
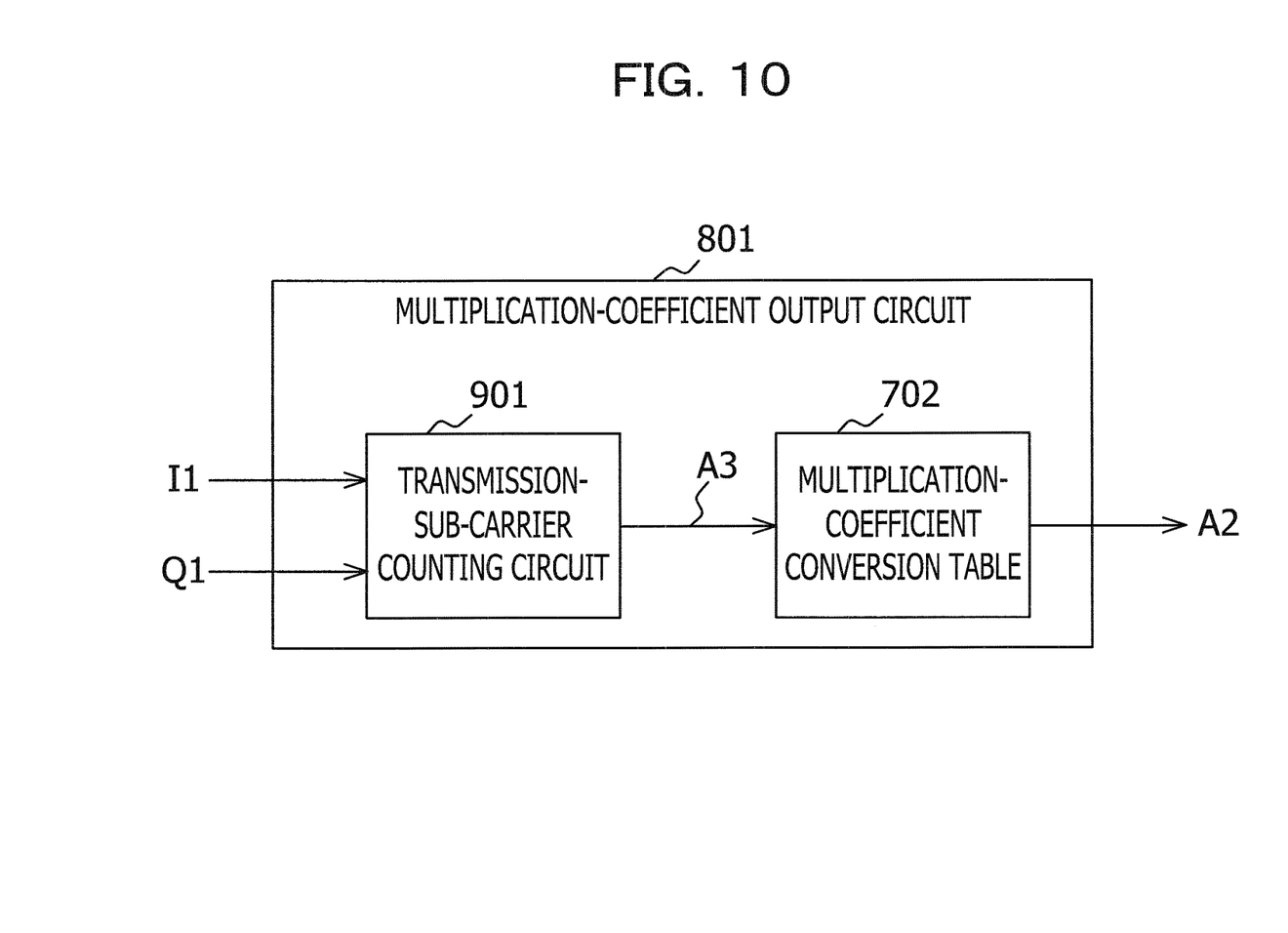
FIG. 10 illustrates an exemplary multiplication-coefficient output circuit.

FIG. 10 illustrates an exemplary multiplication-coefficient output circuit. The multiplication-coefficient output circuit 801 includes a transmission-sub-carriers counting circuit 901 and a multiplication-coefficient conversion table 702. The transmission-sub-carriers counting circuit 901 counts the number of transmission sub-carriers based on the I channel signal I1 and the Q channel signal Q1 output from the vector mapping circuit 102. The counted number of transmission sub-carriers A3 is then output. The I channel signal I1 and the Q channel signal Q1 have values of the constellation points illustrated in FIG. 2 when transmission sub-carriers are allocated, and have values of the origin (0,0) when transmission sub-carriers are not allocated. The multiplication-coefficient conversion table 702 converts the number of transmission sub-carriers A3 to the multiplication coefficient A2 and outputs the multiplication coefficient A2. The advantages of the terminal apparatus illustrated in FIG. 9 may be substantially the same or similar to the advantages of the terminal apparatus illustrated in FIG. 7.

The multiplication-coefficient output circuit 801 may output the multiplication coefficient A2 for each symbol. The multiplication-coefficient output circuit 801 may output the multiplication coefficient A2 corresponding to the number of transmission sub-carriers 1213, which corresponds to the maximum number within the transmission sub-frame. The multiplication-coefficient output circuit 801 may output the multiplication coefficient A2 corresponding to the number of transmission sub-carriers 1213, which is the minimum number within the transmission sub-frame. The multiplication-coefficient output circuit 801 may output the multiplication coefficient A2 corresponding to the average value of the number of transmission sub-carriers per symbol within the transmission sub-frame.

The previous variations may be applied to communication for OFDM, etc.

Example variations of the present invention have now been described in accordance with the above advantages. It will be appreciated that these examples are merely illustrative of the invention. Many variations and modifications will be apparent to those skilled in the art. Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The invention claimed is:

1. A transmission apparatus, comprising:
   a multiplier configured to multiply a first in-phase (I) channel signal and a first quadrature (Q) channel signal for a symbol provided on a complex plane by a multiplication coefficient and output a second I channel signal and a second Q channel signal, a transmission power of constellation points of the second I and Q channel signals being obtained in accordance with a comparison between a number of one or more transmission sub-carriers allocated for the symbol and a given number relating to a transmission sub-frame that includes the symbol in a transmission frame; and
   an inverse fast Fourier transformer configured to perform an inverse fast Fourier transform on the second I and Q channel signals,
   wherein the given number comprises at least one of:
   a maximum number among a plurality of numbers, each of the plurality of numbers being a number of one or more transmission sub-carriers that are allocated for each of a plurality of symbols included in the transmission sub-frame;

a minimum number among a plurality of numbers, each of the plurality of numbers being a number of one or more transmission sub-carriers that are allocated for each of a plurality of symbols included in the transmission sub-frame; and an average value of a plurality of numbers, each of the plurality of numbers being a number of one or more transmission sub-carriers that are allocated for each of a plurality of symbols included in the transmission sub-frame.

2. The transmission apparatus according to claim 1, further comprising:

a vector mapping circuit configured to map a code of the allocated one or more transmission sub-carriers to the first I and Q channel signals provided on the complex plane to create a mapped signal, wherein the multiplier multiplies the mapped signal by the multiplication coefficient.

3. The transmission apparatus according to claim 1, further comprising:

a sub-carrier allocation circuit configured to dynamically allocate the one or more transmission sub-carriers for each symbol.

4. The transmission apparatus according to claim 1, further comprising:

a multiplication-coefficient output circuit configured to:
count a dynamically changing number of the allocated one or more transmission sub-carriers for each symbol, and
output the multiplication coefficient in accordance with the comparison between the counted number of the one or more transmission sub-carriers and the given number.

5. The transmission apparatus according to claim 4, wherein the multiplier selects the multiplication coefficient output from the multiplication-coefficient output circuit.

6. The transmission apparatus according to claim 4, wherein the multiplication-coefficient output circuit is configured to convert the counted number of the one or more transmission sub-carriers to the multiplication coefficient based on a conversion table, and the multiplier selects the multiplication coefficient output from the multiplication-coefficient output circuit.

7. The transmission apparatus according to claim 4, wherein the multiplication-coefficient output circuit counts the dynamically changing number of the one or more transmission sub-carriers for the each symbol by monitoring an enable signal from the sub-carrier allocation circuit.

8. The transmission apparatus according to claim 7, wherein the enable signal is set to a first level when a transmission sub-carrier is allocated and is set to a second level when a transmission sub-carrier is not allocated.

9. The transmission apparatus according to claim 4, wherein the multiplication-coefficient output circuit includes a multiplication-coefficient conversion table that converts the counted number of the one or more transmission sub-carriers into the multiplication coefficient.

10. The transmission apparatus according to claim 1, wherein the multiplier multiplies the multiplication coefficient such that an amplitude of the inverse fast Fourier transformed signal is substantially constant.

11. The transmission apparatus according to claim 1, wherein the transmission power of the constellation points of the second I and Q channel signals is greater than that of the first I and Q channel signals, when the number of the one or more transmission sub-carriers allocated for the symbol is less than the given number.

12. The transmission apparatus according to claim 1, wherein the transmission power of the constellation points of the second I and Q channel signals is less than that of the first I and Q channel signals, when the number of the one or more transmission sub-carriers allocated for the symbol is greater than the given number.

13. A method of transmission, comprising:

multiplying a first in-phase (I) channel signal and a first quadrature (Q) channel signal for a symbol provided on a complex plane by a multiplication coefficient to output a second I channel signal and a second Q channel signal, a transmission power of constellation points of the second I and Q channel signals being obtained in accordance with a comparison between a number of one or more transmission sub-carriers allocated for the symbol and a given number relating to a transmission sub-frame that includes the symbol in a transmission frame; and inverse-fast-Fourier-transforming the second I and Q channel signals, wherein the given number comprises at least one of:

a maximum number among a plurality of numbers, each of the plurality of numbers being a number of one or more transmission sub-carriers that are allocated for each of a plurality of symbols included in the transmission sub-frame;

a minimum number among a plurality of numbers, each of the plurality of numbers being a number of one or more transmission sub-carriers that are allocated for each of a plurality of symbols included in the transmission sub-frame; and an average value of a plurality of numbers, each of the plurality of numbers being a number of one or more transmission sub-carriers that are allocated for each of a plurality of symbols included in the transmission sub-frame.

14. The method of transmission according to claim 13, further comprising:

mapping a code of the allocated one or more transmission sub-carriers to the first I and Q channel signals provided on the complex plane; and multiplying the mapped signal provided on the complex plane by the multiplication coefficient.

15. The method of transmission according to claim 13, further comprising:

dynamically allocating a transmission sub-carrier for each symbol.

16. The method of transmission according to claim 13, further comprising:

counting a dynamically changing number of the allocated one or more transmission sub-carriers for each symbol; and outputting the multiplication coefficient in accordance with comparison between the counted number of the one or more transmission sub-carriers and the given number.

17. The method of transmission according to claim 13, wherein the multiplication coefficient is chosen such that an amplitude of the inverse-fast-Fourier- transformed signal is substantially constant.

18. A transmission apparatus, comprising:

a multiplier configured to multiply a first in-phase (I) channel signal and a first quadrature (Q) channel signal for a symbol provided on a complex plane by a multiplication coefficient and output a second I channel signal and a second Q channel signal, a transmission power of constellation points of the second I and Q channel signals being obtained in accordance with a comparison between a number of one or more transmission sub-carriers allocated for the symbol and a given number relating to a transmission sub-frame that includes the symbol in a transmission frame; and an inverse fast Fourier transformer configured to perform an inverse fast Fourier transform on the second I and Q channel signals, wherein the transmission power of the constellation points of the second I and Q channel signals is greater than that of the first I and Q channel signals, when the number of the one or more transmission sub-carriers allocated for the symbol is less than the given number.

19. A transmission apparatus, comprising:

a multiplier configured to multiply a first in-phase (I) channel signal and a first quadrature (Q) channel signal for a symbol provided on a complex plane by a multiplication coefficient and output a second I channel signal and a second Q channel signal, a transmission power of constellation points of the second I and Q channel signals being obtained in accordance with a comparison between a number of one or more transmission sub-carriers allocated for the symbol and a given number relating to a transmission sub-frame that includes the symbol in a transmission frame; and an inverse fast Fourier transformer configured to perform an inverse fast Fourier transform on the second I and Q channel signals, wherein the transmission power of the constellation points of the second I and Q channel signals is less than that of the first I and Q channel signals, when the number of the one or more transmission sub-carriers allocated for the symbol is greater than the given number.

* * * * *